(12) United States Patent
Hashimoto et al.

(10) Patent No.: US 9,993,862 B2
(45) Date of Patent: Jun. 12, 2018

(54) FIN MANUFACTURING APPARATUS

(71) Applicant: DAIKIN INDUSTRIES, LTD., Osaka-shi, Osaka (JP)

(72) Inventors: Nao Hashimoto, Kusatsu (JP); Shouji Nobui, Kusatsu (JP); Takuya Haraguchi, Kusatsu (JP); Yoshito Katada, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 223 days.

(21) Appl. No.: 15/107,443

(22) PCT Filed: Nov. 19, 2014

(86) PCT No.: PCT/JP2014/080687
§ 371 (c)(1),
(2) Date: Jun. 22, 2016

(87) PCT Pub. No.: WO2015/098378
PCT Pub. Date: Jul. 2, 2015

(65) Prior Publication Data
US 2016/0318090 A1    Nov. 3, 2016

(30) Foreign Application Priority Data
Dec. 25, 2013    (JP) .................................. 2013-267728

(51) Int. Cl.
*B21D 53/02*    (2006.01)
*B21D 53/08*    (2006.01)
(Continued)

(52) U.S. Cl.
CPC ........... *B21D 53/022* (2013.01); *B21D 53/08* (2013.01); *B23D 15/08* (2013.01); *B23D 35/001* (2013.01);
(Continued)

(58) Field of Classification Search
CPC .... F28F 3/02; F28F 3/025; F28F 3/027; F28F 3/04; F28F 3/046; F28F 1/24; F28F 1/30;
(Continued)

(56) References Cited

U.S. PATENT DOCUMENTS

2008/0179048 A1* 7/2008 Yaezawa ................ B21D 13/04
165/152

FOREIGN PATENT DOCUMENTS

JP    10-160378 A    6/1998

OTHER PUBLICATIONS

English translation of JP 10-160378.*
(Continued)

*Primary Examiner* — Jun Yoo
(74) *Attorney, Agent, or Firm* — Global IP Counselors, LLP

(57) ABSTRACT

A fin manufacturing apparatus includes an inter-row slit processing device having upper and lower blades with blade edges extending in a feed direction of a thin metal plate that serves as a material of a fin. The upper and lower blades are engaged with each other to form a perforated slit between rows on the fin. Each blade has a recess where the blade edge is partially recessed toward a ridge. Recess depth dimensions are smaller than a lapping amount of the blades when the blades are engaged with each other. At least one of the blades is slidable in a longitudinal direction of the blade edge to allow the recesses to be moved from overlapping positions to adjacent positions as viewed along a direction orthogonal to the longitudinal direction of the blade edges when the blades are engaged with each other over the lapping amount.

4 Claims, 6 Drawing Sheets

(51) Int. Cl.
*F28F 1/32* (2006.01)
*B23D 15/08* (2006.01)
*B23D 35/00* (2006.01)
*B23P 15/26* (2006.01)
*F28D 1/047* (2006.01)

(52) U.S. Cl.
CPC ................ *B23P 15/26* (2013.01); *F28F 1/32* (2013.01); *F28D 1/0477* (2013.01)

(58) Field of Classification Search
CPC .... F28F 1/32; F28F 1/325; F28F 1/126; F28F 1/128; F28F 2215/02; F28F 2215/04; F28F 2215/08; F28F 2215/00; F28D 9/0062; F28D 9/0075; F28D 9/00; F28D 9/005; B23P 15/26; Y10T 29/4935; Y10T 29/4938; Y10T 29/49368; Y10T 29/49366; B21D 53/022; B21D 53/025; B21D 53/04; B21D 53/08; B23D 15/08; B23D 35/001; B23D 35/00; B23D 35/005; B23D 35/008
See application file for complete search history.

(56) References Cited

OTHER PUBLICATIONS

International Preliminary Report of corresponding PCT Application No. PCT/JP2014/080687 dated Jun. 28, 2016.
International Search Report of corresponding PCT Application No. PCT/JP2014/080687 dated Feb. 24, 2015.

* cited by examiner

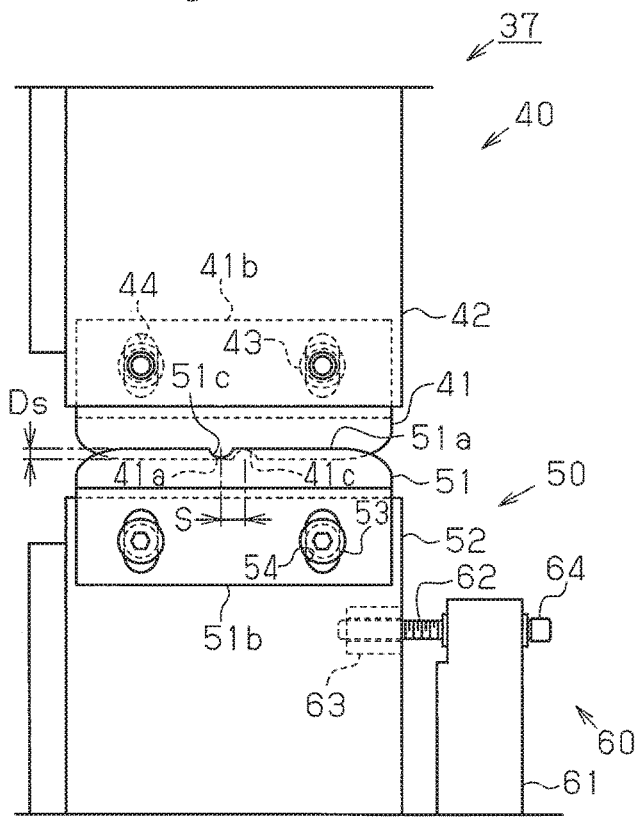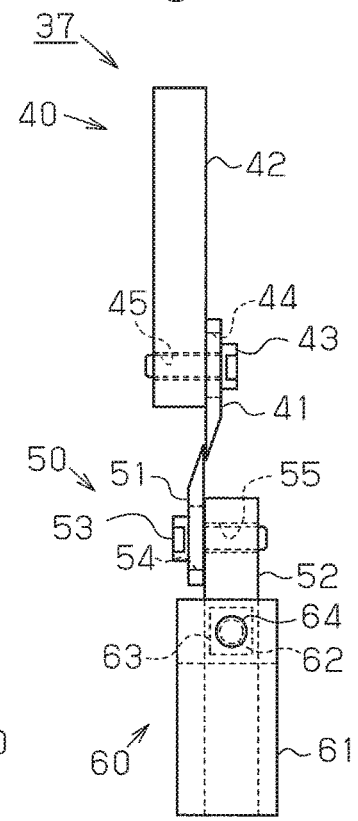

US 9,993,862 B2

FIN MANUFACTURING APPARATUS

CROSS-REFERENCE TO RELATED APPLICATIONS

This U.S. National stage application claims priority under 35 U.S.C. § 119(a) to Japanese Patent Application No. 2013-267728, filed in Japan on Dec. 25, 2013, the entire contents of which are hereby incorporated herein by reference.

TECHNICAL FIELD

The present invention relates to a fin manufacturing apparatus including an inter-row slit processing device.

BACKGROUND ART

A cross fin tube-type heat exchanger used in an air conditioner, a refrigerator, or the like undergoes a process for processing fins that form slits between rows of collars through which a heat transfer pipe is extended. The processed inter-row slits mainly include a cutting slit that completely cuts a portion between rows when forming a predetermined number of rows of fins and a perforated slit that forms non-continuous slits at constant intervals to reduce the transfer of heat between the rows. In the perforated slit, the length of a portion between slits (that is, non-cut portion, hereinafter referred to as the "perforated portion") and the length of a slit are set to various values in accordance with the specification of the heat exchanger such as the dimensions and shape, the application of the heat exchanger, and the required fin strength. It is thus desired that the fin manufacturing apparatus that forms perforated slits be able to change the lengths of the perforated portion and the slit (that is, non-cut portion and cut portion) in the formed perforated slit.

Japanese Laid-Open Patent Publication No. 10-160378 describes such a fin manufacturing apparatus. A processing device that forms inter-row perforated slits used for the fin manufacturing apparatus of Japanese Laid-Open Patent Publication No. 10-160378 changes a forward-feed pitch of a thin metal plate, which is the material of a fin, to change the lengths of a perforated portion and a slit using the same cutting blades.

SUMMARY

Problems that are to be Solved by the Invention

However, a typical fin manufacturing apparatus forward-feeds a thin metal plate, which is the material of a fin, and uses progressive dies to perform various types of shaping. The various types of shaping include, for example, a louver fin process for forming louver fins, a process for forming collars through which a heat transfer pipe is extended, an inter-row slit process for forming perforated slits between rows or cutting slits for cutting fins, and a cut-off process for cutting a fin to a predetermined length. Thus, the forward-feed pitch of a thin metal plate is set to the integral multiple of the pitch of the collars, for example, two times of the pitch because of reasons related to the processing of each portion. Practical use of a progressive die is thus difficult when changing the forward-feed pitch of a thin metal plate to an arbitrary pitch as described in the fin manufacturing apparatus of Japanese Laid-Open Patent Publication No. 10-160378.

Accordingly, it is an object of the present invention to provide an inter-row fin manufacturing apparatus that allows the length of a perforated slit located between rows to be changed.

Means for Solving the Problem

A fin manufacturing apparatus that solves the above problem includes an inter-row slit processing device that includes an upper blade and a lower blade having blade edges extending in a feed direction of a thin metal plate that serves as a material of a fin. In the fin manufacturing apparatus, the upper blade and the lower blade are engaged with each other to form a perforated slit between rows on the fin. The upper blade and the lower blade each include a recess in which the blade edge is partially recessed toward a ridge. The upper blade and the lower blade have recess depth dimensions that are smaller than a lapping amount of the upper blade and the lower blade when the upper blade and the lower blade are engaged with each other to process the perforated slit between rows of the thin metal plate. At least any one of the upper blade and the lower blade is slidable in a feed direction of the thin metal plate to allow the recesses to be moved from overlapping positions to adjacent positions in a view of the upper blade and the lower blade in a direction orthogonal to the longitudinal direction of the blade edges when the upper blade and the lower blade are engaged with each other over the lapping amount. The "front surface of the upper blade and the lower blade" is a surface in a direction orthogonal to the feed direction of the thin metal plate. In the front surface, the feed direction is on the right.

In the inter-row slit processing device having such a structure, the recess depth dimensions of the upper and lower blades are smaller than a lapping amount of the upper and lower blades when the upper and lower blades are engaged with each other to process the perforated slit, and any one of the upper and lower blades is slidable in this state. Further, this movement changes an overlapping dimension of the recesses of the upper and lower blades from the overlapping positions to the adjacent positions in the direction orthogonal to the direction of the blade edge length. Accordingly, in the fin manufacturing device, while maintaining the forward-feed pitch of other processes and using the same upper blade and the same lower blade, the overlapped dimension of the two recesses is changed to vary the lengths of the perforated portion and the slit. Thus, by modifying the slit processing device in the conventional fin manufacturing apparatus as described above, the manufacturing apparatus may be modified to be capable of changing the lengths of the perforated portion and the slit.

It is preferred that among the upper blade and the lower blade, the lower blade be slidable in the longitudinal direction of the blade edge.

In such a structure, the sliding mechanism is configured to slide the lower blade, which is not moved in a vertical direction when the upper blade and the lower blade are engaged with each other, in the feed direction of the thin metal plate. This simplifies a mechanism that moves the lower blade.

It is preferred that the upper blade and the lower blade be symmetrical with respect to a center line in the longitudinal direction of the blade edges. Further, it is preferred that when the upper blade and the lower blade are opposed to each other in the vertical direction so that two ends of the upper blade are aligned with two ends of the lower blade to form the perforated slit, the recesses are arranged adjacent to each other in the direction orthogonal to the longitudinal direction of the blade edge.

Such a structure eliminates unnecessary play when adjusting dimensions with the sliding mechanism and allows for effective adjustment of the length of the slit.

Effects of the Invention

The present fin manufacturing apparatus allows the lengths of a perforated portion and a slit to be changed without changing the forward-feed pitch from that of the prior art.

BRIEF DESCRIPTION OF THE DRAWINGS

FIG. 4A is a front view showing an inter-row slit processing device of the fin manufacturing apparatus located at a reference position.

FIG. 4B is a right side view showing the inter-row slit processing device located at the reference position.

MODES FOR CARRYING OUT THE INVENTION

Overview of Heat Exchanger of Present Embodiment

Figure 1:
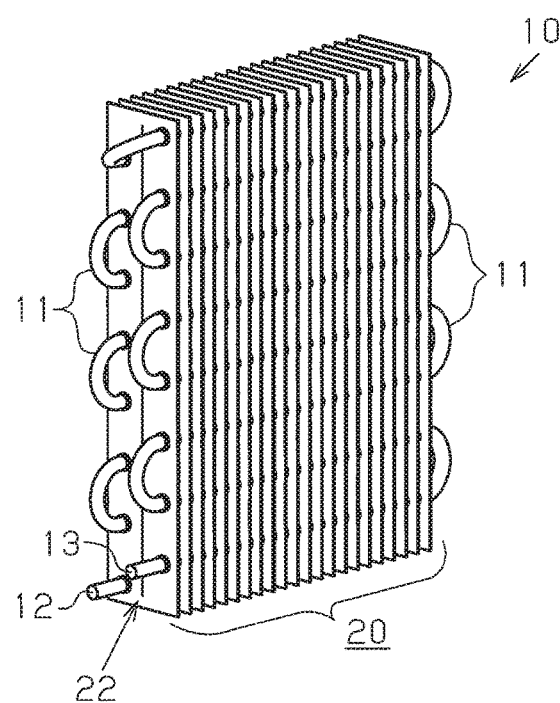
FIG. 1 is a perspective view of a heat exchanger that uses fins shown in FIG. 2.

As shown in FIG. 1, a heat exchanger 10 of the present embodiment is a heat exchanger for an air conditioner and is a cross in tube-type heat exchanger using fins 20, which are formed of thin metal plates and manufactured by a fin manufacturing apparatus of the present embodiment.

As shown in FIG. 1, the heat exchanger 10 of the present embodiment is a cross fin tube-type heat exchanger including the fins 20, which are stacked at a constant pitch, and a heat transfer pipe 11 having a plurality of U-shaped portions. In the heat exchanger 10, the heat transfer pipe 11 is arranged in a staggered pattern on the fins 20. In this example, the heat transfer pipe 11 is staggered in two rows and eight lines. The heat exchanger 10 is an outdoor coil in which one of the lowest lines serves as an inlet 12 and the other one serves as an outlet 13. When the heat exchanger 10 operates and functions as a condenser, heat conveyed between the rows hinders the liquefying of refrigerant. To limit the conveyance of heat, the heat exchanger 10 includes perforated slits 22, which are arranged between the rows.

Figure 2:
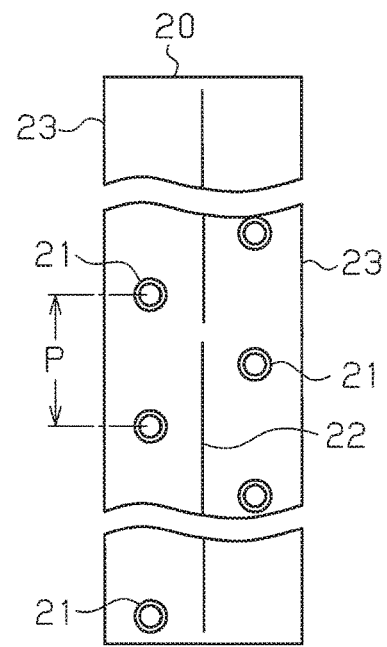
FIG. 2 is a plan view of a fin manufactured by a fin manufacturing apparatus according to one embodiment.

As shown in FIG. 2, the fin 20 used for the heat exchanger 10 includes the inter-row perforated slits 22 and collars 21 through which the heat transfer pipe 11 is extended. Further, the fin 20 includes a louver fin between the rows that improves the heat transfer rate. To simplify the description of the present embodiment, the lower fins are not shown in the drawings.

Entire Structure of Fin Manufacturing Apparatus

The fin manufacturing apparatus of the present embodiment will now be described.

Figure 3:
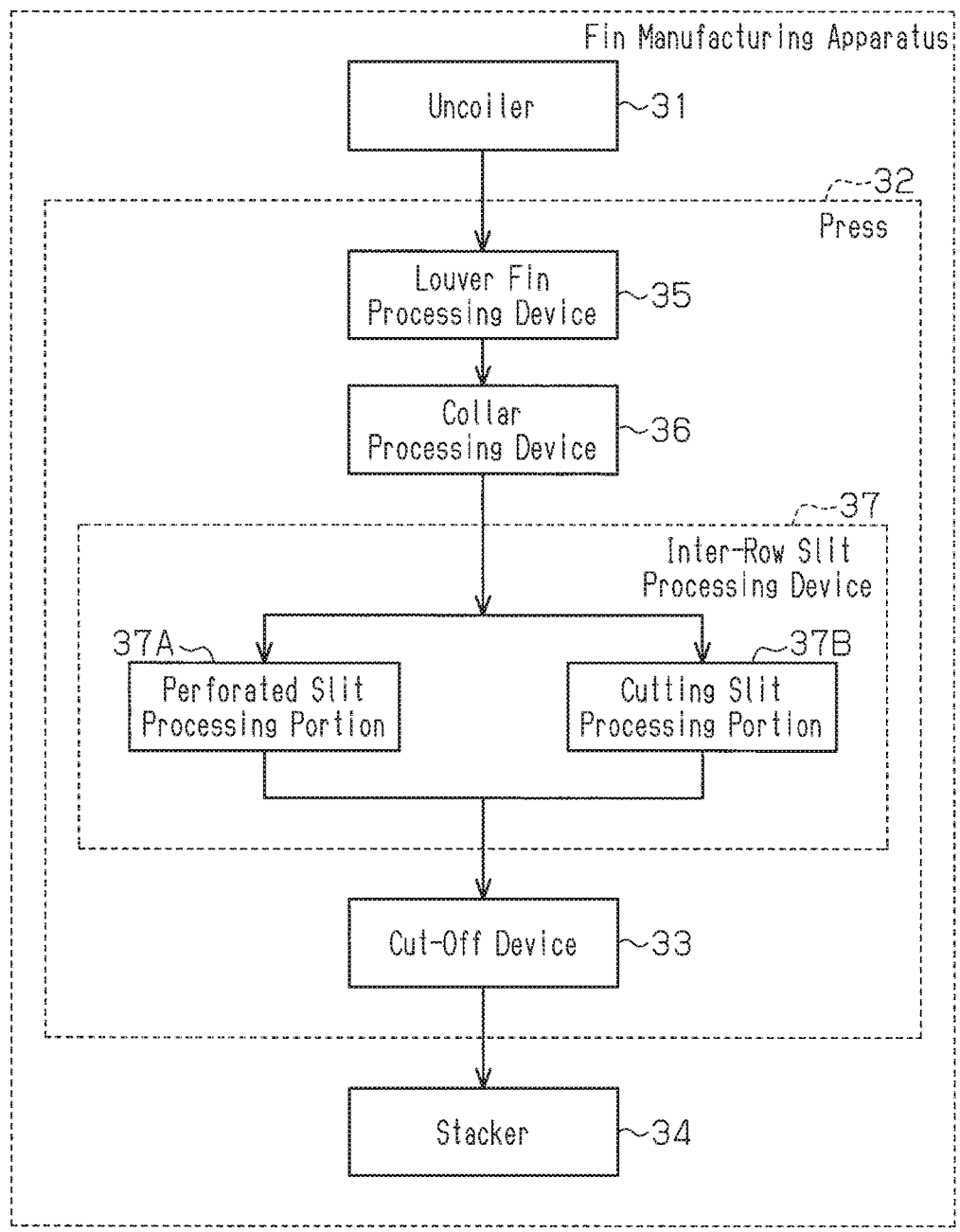
FIG. 3 is a schematic diagram showing the manufacturing apparatus.

In FIG. 3, processing devices are arranged in order of process. As can be understood from FIG. 3, the fin manufacturing apparatus includes an uncoiler 31, a press 32, and a cut-off device 33. A thin metal plate that serves as the material of the fin 20 is coiled around the uncoiler 31. The press 32 shapes the fin 20. The cut-off device 33 cuts the thin metal plate to a predetermined length at a predetermined position. Further, the fin manufacturing apparatus includes a stacker 34 that stacks the fins 20 that have been cut into finished products and then stores the stacked fins 20.

The press 32, which serves as the main section of the fin manufacturing apparatus, includes a louver fin processing device 35 that processes louver fins to the fins 20, a collar processing device 36 that processes the collars 21 through which the heat transfer pipe 11 is extended, and an inter-row slit processing device 37 that processes slits between the rows of the collars 21.

The inter-row slit processing device 37 includes a perforated slit processing portion 37A and a cutting slit processing portion 37B. The perforated slit processing portion 37A forms the perforated slits 22 that are used to cut a thin metal plate between predetermined rows to form a predetermined row of fins 20. The cutting slit processing portion 37B processes the cutting slits 23. For example, when the fin 20 of FIG. 2 is manufactured, the perforated slits 22 and the cutting slits 23 are processed every other row. The cutting slits 23 are formed by processing the fin 20 at the ends in the row direction as viewed in FIG. 2 A slit formed in the process of each forward-feed pitch is longer than a forward-feed pitch (in this case, two times longer than pitch P of collars 21) so that the end of a slit formed in a process is overlapped with the end of a slit formed in the following process. In this manner, slits are formed continuously to cut the thin metal plate on the line of the slits.

Structure of Inter-Row Slit Processing Device

The above fin manufacturing apparatus is similar to the conventional fin manufacturing apparatus except for the inter-row slit processing device 37. Thus, only the inter-row slit processing device 37 will be described below in detail.

As described above, the inter-row slit processing device 37 includes the perforated slit processing portion 37A and the cutting slit processing portion 37B. The perforated slit processing portion 37A and the cutting slit processing portion 37B differ in the structure of the coupled upper and lower blades, the setting of the lapping amount when the upper and lower blades are engaged with each other, and the setting of a sliding adjustment mechanism that changes the position of the lower blade in the feed direction. Otherwise, the perforated slit processing portion 37A and the cutting slit processing portion 37B have the same basic structure. Thus, the description focuses on the perforated slit processing portion 37A. In the description of the perforated slit processing portion 37A, the differences from the cutting slit processing portion 37B will be clarified. In the description hereafter, the front, rear, left, and right directions are as indicated by the arrows shown in FIGS. 4A and 4B.

As shown in FIGS. 4A and 4B, the inter-row slit processing device 37 includes an upper unit 40, which includes an upper blade 41, and a lower unit 50, which includes a lower blade 51.

Figure 5A:
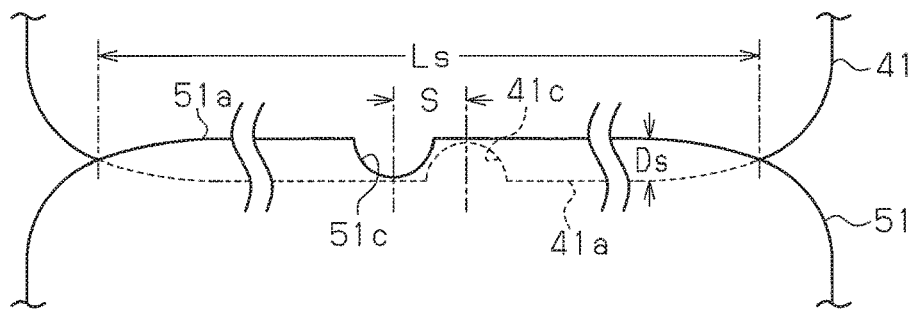
FIG. 5A shows a perforated portion processing portion of the inter-row slit processing device located at the reference position when an upper blade engages with a lower blade.
Figure 5B:
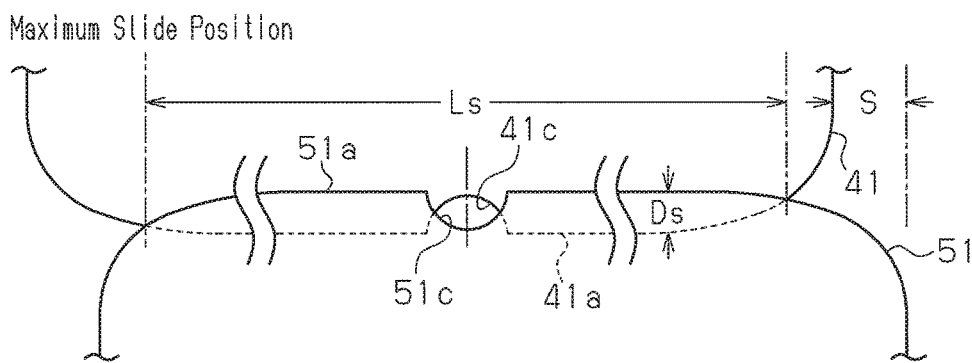
FIG. 5B shows the perforated portion processing portion when the upper blade engages with the lower blade after sliding adjustment is performed by a sliding mechanism.

The upper unit 40 includes the upper blade 41 and an upper blade support 42. The upper blade 41, which is rectangular, has a lower end serving as a blade edge 41a. The upper blade 41 is arranged so that the blade edge 41a extends in the feed direction. The upper blade 41 of FIGS. 4A and 4B, which is used for the perforated slit processing portion 37A, includes an arcuate recess 41c. The recess 41c extends from the middle of the blade edge 41a toward a ridge 41b. As shown in FIGS. 5A and 5B, the recess depth of the recess 41c is smaller than the lapping amount Ds of the upper and lower blades when processing the perforated slits 22. The upper blade 41 used for the cutting it processing portion 37B does not include the recess 41c.

The two ends of the blade edge 41a of the upper blade 41 are formed in an arcuate manner so that whisker-like cutting chips are not formed when processing slits. The upper blade 41 is coupled to the upper blade support 42 by two bolts 43. To perform this coupling, the upper blade 41 includes screw insertion holes 44 that are elongated in the vertical direction, and the upper blade support 42 includes screw holes 45 to which screws are fastened. Thus, the upper unit 40 allows the coupling position of the upper blade 41 to be adjusted in the vertical direction by using the screw insertion holes 44 to move the upper blade 41 in the vertical direction. Alternatively, an adjustment mechanism that facilitates adjustment of the vertical position with a screw adjustment mechanism may be used.

The lower unit 50 includes the lower blade 51, a lower blade support 52, and a sliding mechanism 60.

As shown in FIG. 4B, the lower blade 51 is located in front of the upper blade 41 and is coupled opposing the upper blade 41 in the vertical direction so that the lower blade 51 and the upper blade 41 are engaged with each other in a scissor-like manner. The lower blade 51, which is rectangular, includes an upper end that serves as the blade edge 51a. The lower blade 51 is formed so that the two ends of the blade edge 51a have the same arcuate form as the upper blade 41. The lower blade 51, which is used for processing the perforated portion, includes an arcuate recess 51c, which extends from the middle of the blade edge 51a toward a ridge 51b and has the same form as the recess 41c of the upper blade 41.

The lower blade 51 is coupled to the lower blade support 52 by two bolts 53. To perform this coupling, the lower blade 51 includes screw insertion holes 54 that are elongated in the vertical direction, and the lower blade support 52 includes screw holes 55 to which screws are fastened.

As shown in FIG. 5A, when the lower blade 51 and the upper blade 41 are opposed to each other in the vertical direction at a position where the left and right ends are aligned width each other (hereinafter referred to as "reference position"), the recess 51c is located so that the recess 41c of the upper blade 41 and the recess 51c of the lower blade 51 are arranged adjacent to each other at opposite sides of the center line in the sideward direction. Thus, the lower blade 51 and the upper blade 41 are symmetrical relative to the center line in the longitudinal direction of the blade edges 41a and 51a, and the recesses 41c and 51c are located adjacent to each other at the opposite sides of the center line in the sideward direction when the lower blade 51 and the upper blade 41 are coupled vertically opposing each other. The lower blade 51 used for the cutting slit processing portion 37B differs from the perforated slit processing portion 37A in that the lower blade 51 does not include the recess 51c. Accordingly, the upper blade 41 and the lower blade 51 of the cutting slit processing portion 37B are the same as each other.

The sliding mechanism 60 includes a fixed base 61, a feed screw 62, a nut 63, and a knob 64. The fixed base 61 is fixed to a lower die set (not shown).

The feed screw 62 is fixed to the fixed base 61 in a rotatable manner. The nut 63 is fixed to the lower blade support 52. The feed screw 62 is engaged with the nut 63.

Figure 6:
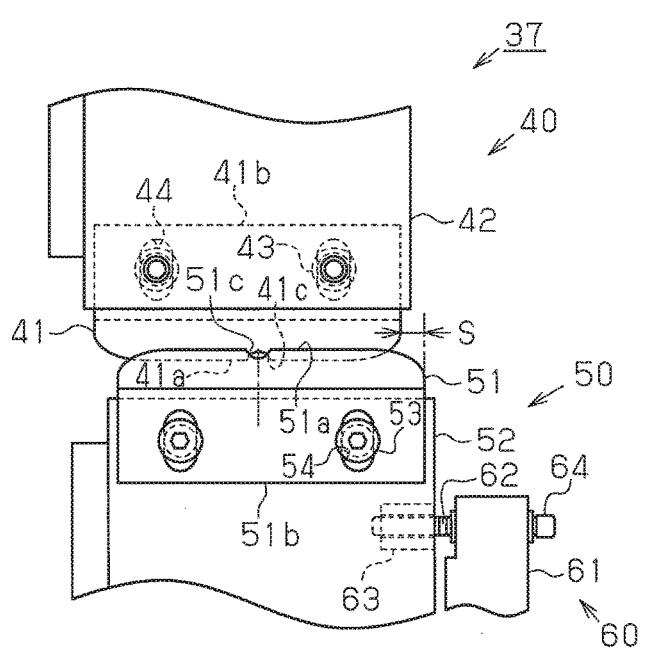
FIG. 6 a front view showing the inter-row slit processing device after the sliding adjustment is performed.

The knob 64 is rotated to change the position where the feed screw 62 and the nut 63 are engaged with each other. This slides the lower blade support 52 and the lower blade 51 in the feed direction. As shown in FIGS. 6 and 5B, when the knob 64 is operated to move the lower blade 51 toward the fixed base 61 by a shift amount S from the center positions of the recesses 41c and 51c in FIG. 5A, the center positions of the recesses 41c and 51c are aligned.

In the perforated slit processing portion 37A, the sliding mechanism 60 is set to be able to move the lower blade 51 from the reference position, which is as described above, toward the fixed base 61 by at least the distance S. The sliding mechanism 60 is not used for the cutting slit processing portion 37B.

The upper unit 40 includes a lifting/lowering mechanism (not shown) that lifts and lowers the upper blade 41 remaining coupled to the upper blade support 42. The upper blade 41 is configured to be vertically movable with a predetermined stroke by actuating the lifting/lowering device. Thus, in the inter-row slit processing device 37, the coupling position of the upper blade 41 is changed and adjusted to adjust the lapping amount.

The lapping amount affects the length of the formed slit. Thus, the lapping amounts in the perforated slit processing portion 37A and the cutting slit processing portion 37B are adjusted in the following manner.

Figure 7:
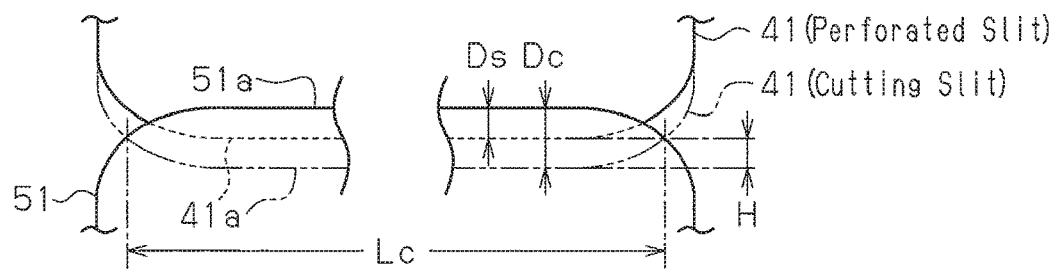
FIG. 7 shows a lapping amount of the upper and lower blades of the inter-row slit processing device.

As shown in FIG. 7, the lapping amount of the upper and lower blades in the cutting slit processing portion 37B (hereinafter referred to as "cutting lapping amount Dc") is set to be larger than the lapping amount of the perforated slit processing portion 37A (hereinafter referred to as "perforation lapping amount Ds"). To increase the cutting lapping amount Dc of the cutting slit processing portion 37B in this manner, the upper blade 41 of the cutting slit processing portion 37B is coupled at a position lower by the predetermined dimension H than the coupling position of the upper blade 41 in the perforated slit processing portion 37A.

Thus, the engaged portion of the upper and lower blades in the cutting slit processing portion 37B has a length in a direction of the blade edge, namely, the engagement length during a cutting process (hereinafter referred to as "cutting engagement length Pc"). The cutting engagement length Lc is set to be larger than the length when the perforated slit 22 is processed (hereinafter referred to as "perforation engagement length Ls"). Further, the cutting engagement length. Lc is larger than the forward-feed pitch (two times greater than pitch P of collars). The perforation engagement length Ls is set to be smaller than the forward-feed pitch.

Figure 8:
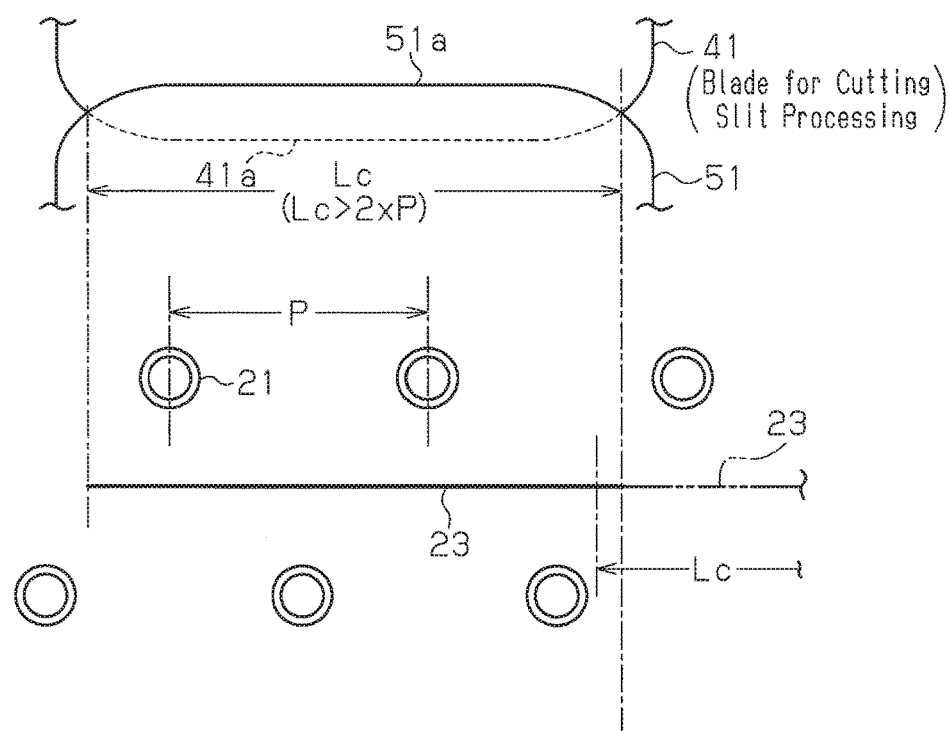
FIG. 8 shows the relationship of a cutting slit and an engagement state of the upper and lower blades in the cutting slit processing portion of the inter-row slit processing device.

In such a setting, as shown in FIG. 8, engagement of the upper and lower blades in the cutting slit processing portion 37B forms a slit in a thin metal plate as the cutting slit 23 having a length that is greater than the forward-feed pitch (2×P). The cutting slit 23 formed in this manner is overlapped with an end of the former cutting slit 23 so that the two slits 23 are continuous with each other. Thus, the thin metal plate is cut along the line that forms the cutting slits 23.

The slits formed in the perforated slit processing portion 37A will now be described.

Figure 9:
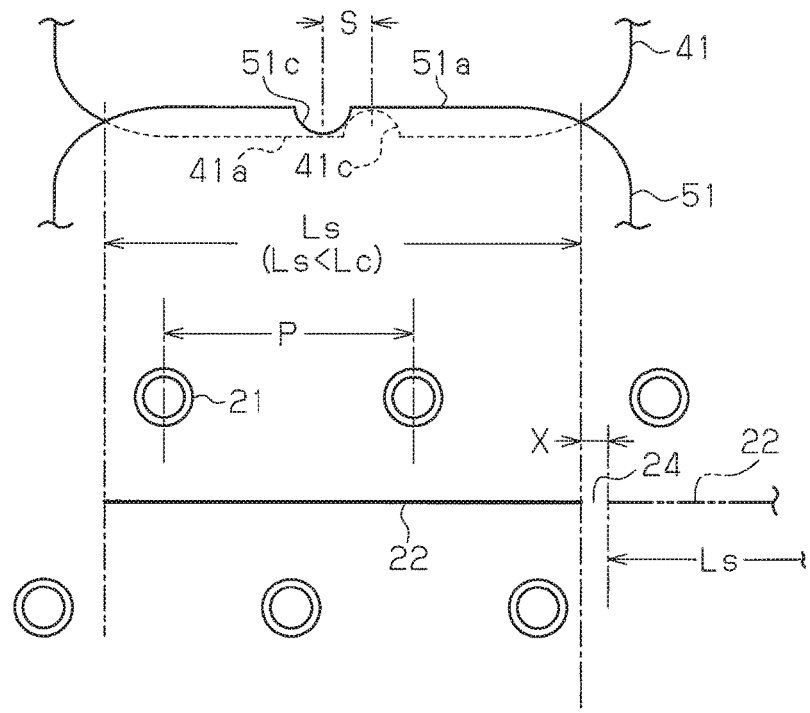
FIG. 9 shows the relationship of a perforated slit and an engagement state of the upper and lower blades in the perforated slit processing portion of the inter-row slit processing device located at the reference position.

As shown in FIG. 9, when the lower blade is arranged in the forward-feed direction at the reference position (refer to FIGS. 4A, 4B, and 5A), the perforation engagement length Ls is smaller than the forward-feed pitch. Thus, the perforated slit 22 formed in this process has the same length as the perforation engagement length Ls. This forms a gap 24 having a predetermined length X between the perforated slit 22 formed in this process and the perforated slit 22 formed in the former process. The perforated portion of the perforated slit 22, that is, a non-cut portion, has the predetermined length X. The predetermined length X is equal to the difference of the forward-feed pitch and the perforation engagement length Ls. This perforated portion is hereinafter referred to as the "fixed perforated portion 24."

Figure 10:
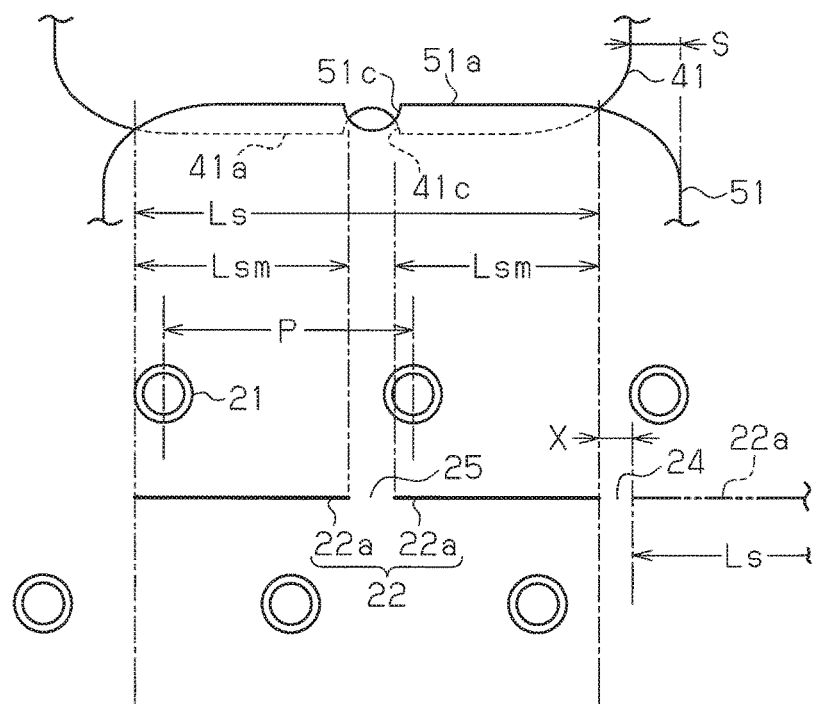
FIG. 10 shows the relationship of a perforated slit and an engagement state of the upper and lower blades in the perforated slit processing portion of the inter-row slit processing device located at the position after sliding adjustment is performed.

As shown in FIG. 10, when the lower blade is moved by the distance S in the feed direction (right) from the reference position (refer to FIG. 5B), the recesses 41c and 51c of the upper and lower blades are overlapped with each other with the center lines in alignment. Thus, the thin metal plate is not cut in most of the portion where the recesses 41c and 51c are overlapped. The recesses 41c and 51c act to form a perforated portion in the middle of the perforated slit 22, that is, a non-cut portion. The length of the perforated portion shown in FIG. 10 is maximum, and the length can be changed by a distance the sliding mechanism 60 is moved. Thus, the perforated portion is hereinafter referred to as the "adjusted perforated portion 25." Accordingly, the perforated slit 22 includes two slit segments 22a, which are located at the left and right of the adjusted perforated portion 25. The sliding mechanism 60 is moved to adjust and change the length Lsm of the slit segments 22a in correspondence with the changed length of the adjusted perforated portion 25.

Operation

The operation of the fin manufacturing apparatus will now be described.

The louver fin processing device 35 forms a louver fin (not shown) in a thin metal plate drawn out of the uncoiler 31, and the collar processing device 36 forms the collars 21 in the thin metal plate. Then, the inter-row slit processing device 37 forms predetermined slits on a line, which is set in advance, in the thin metal plate including the collars 21. The cutting slit processing portion 37B forms the cutting slits 23 on the lines located along the ends of the fin 20 in the row direction. The perforated slits 22 are formed on the line located between the rows of the fins 20.

Based on the specification of the fins 20, it is determined whether the perforated slit 22 includes, as the perforated portion, the fixed perforated portion 24 or the adjusted perforated portion 25. In the fin manufacturing apparatus, the sliding mechanism 60 is adjusted to obtain the determined slit. The sliding mechanism 60 adjusts the lengths of the slit segments 22a, the fixed perforated portion 24, and the adjusted perforated portion 25. The adjustment performed by the sliding mechanism does not affect the forward-feed pitch and thus does not affect other processes.

The thin metal plate that has undergone slit processing in the inter row slit processing device 37 is cut by the cut-off device 33 at predetermined lengths to obtain the final fins 20. The fins 20 manufactured in this manner are stored on the stacker 34.

The fin manufacturing apparatus according to the present embodiment has the advantages described below.

(1) While maintaining the forward-feed pitch of other processes and using the same upper blade 41 and the same lower blade 51, the overlapped dimension of the recess 41c in the upper blade 41 and the recess 51c in the lower blade 51 is changed to vary the lengths of the adjusted perforated portion 25, the perforated slit 22, and the slit segment 22a. Thus, by modifying the inter-row slit processing device 37 in the conventional fin manufacturing apparatus as described above, the manufacturing apparatus may be modified to be capable of changing the lengths of the adjusted perforated portion 25, the perforated slit 22, and the slit segment 22a.

(2) The sliding mechanism 60 is configured to slide the lower blade 51, which is not vertically moved when forming the perforated slit 22, in the feed direction. This simplifies the structure of the sliding mechanism 60.

(3) The upper blade 41 and the lower blade 51 are symmetrical with respect to the center line in the longitudinal direction of the blade edges 41a and 51a. The upper blade 41 and the lower blade 51 are opposed to each other in the vertical direction so that the two ends of the upper blade 41 are aligned with the two ends of the lower blade 51 in the direction of the blade edge length. When the upper blade 41 and the lower blade 51 are engaged with each other to form slits, the recesses 41c and 51c are arranged adjacent to each other at opposite sides of the center line in the longitudinal direction of the blade edges 41a and 51a in a direction orthogonal to the longitudinal direction of the blade edges 41a and 51a. This eliminates unnecessary play when adjusting dimensions with the sliding mechanism 60 and allows for effective adjustment of the lengths of the perforated slit 22 and the slit segment 22a.

Modified Examples

In the above embodiment, the upper blade 41 and the lower blade 51 used in the cutting slit processing portion 37B do not include the recesses 41c and 51c. Instead, the upper blade 41 and the lower blade 51 of the cutting slit 23 used in the cutting slit processing portion 37B may include the recesses 41c and 51c in the same manner as the perforated slit processing portion 37A. That is, when the cutting slit 23 is formed, the upper blade 41 and the lower blade 51 are engaged with each other over the cutting lapping amount Dc that is larger than the depth of the recesses 41c and 51c. This allows slits to be formed in the overlapped portion of the recesses 41c and 51c.

In the above embodiment, the recess 41c of the upper blade 41 and the recess 51c of the lower blade 51 are arranged adjacent to each other at the reference position as viewed from the front and are overlapped with each other by an adjustment performed by the sliding mechanism 60. However, this may be reversed. That is, the recess 41c of the upper blade 41 and the recess 51c of the lower blade 51 may be overlapped with each other at the reference position and may be adjusted to the adjacent position by an adjustment performed by the sliding mechanism 60.

In the above embodiment, the recesses 41c and 51c are located at the middle portions of the blade edges 41a and 51a. Instead, for example, the recesses 41c and 51c may be located between the middle portion and the end in the blade edge longitudinal direction of any one of the blade edges 41a and 51a.

In the above embodiment, the upper and lower blades are symmetrical with respect to the center line in the longitudinal direction of the blade edges 41*a* and 51*a*. Instead, for example, the recess 41*c* or 51*c* of one of the upper and lower blades may be longer in the longitudinal direction of the blade edges 41*a* and 51*a* than the recess 41*c* or 51*c* of the other one.

In the above embodiment, the recesses 41*c* and 51*c* in the upper and lower blades form a single pair. Instead, there may be multiple pairs of the recesses 41*c* and 51*c* in the upper and lower blades.

In the above embodiment, the sliding mechanism 60 is operated manually. Instead, the sliding mechanism 60 may be performed by an electrical actuator. Such a structure allows for accurate movement of the lower blade 51 in the longitudinal direction.

In the above embodiment, the lower unit 50 includes the sliding mechanism 60, and the lower blade 51 is slidable in the longitudinal direction. Instead, the upper unit 40 may include the sliding mechanism 60, and the upper blade 41 may be slidable in the longitudinal direction.

In the above embodiment, the fins 20 including the perforated slits 22 between rows are applied to an outdoor coil. Instead, the fins 20 may be applied to other heat exchangers such as an indoor coil that limits heat conveyance between rows.

What is claimed is:

1. A fin manufacturing apparatus comprising:
   an inter-row slit processing device including an upper blade and a lower blade, the upper and lower blades having blade edges extending in a feed direction of a thin metal plate that serves as a material of a fin,
   the upper blade and the lower blade being engaged with each other to form a perforated slit between rows on the fin,
   each of the upper blade and the lower blade including a recess where the blade edge is partially recessed toward a ridge
   the upper blade and the lower blade having recess depth dimensions that are smaller than a lapping amount of the upper blade and the lower blade when the upper blade and the lower blade are engaged with each other to form the perforated slit between rows of the thin metal plate, and
   at least one of the upper blade and the lower blade being slidable in a longitudinal direction of the blade edge to allow the recesses to be moved from overlapping positions to adjacent positions as viewed along a direction orthogonal to the longitudinal direction of the blade edges when the upper blade and the lower blade are engaged with each other over the lapping amount.

2. The fin manufacturing apparatus according to claim 1, wherein
   of the upper blade and the lower blade, the lower blade is slidable in the longitudinal direction of the blade edge.

3. The fin manufacturing apparatus according to claim 1, wherein
   the upper blade and the lower blade are symmetrical with respect to a center line extending along the longitudinal direction of the blade edges, and
   when the upper blade and the lower blade are opposed to each other in a vertical direction so that two ends of the upper blade are aligned with two ends of the lower blade to form the perforated slit, the recesses are arranged adjacent to each other as viewed along the direction orthogonal to the longitudinal direction of the blade edge.

4. The fin manufacturing apparatus according to claim 2, wherein
   the upper blade and the lower blade are symmetrical with respect to a center line extending along the longitudinal direction of the blade, and
   when the upper blade and the lower blade are opposed to each other in a vertical direction so that two ends of the upper blade are aligned with two ends of the lower blade to form the perforated slit, the recesses are arranged adjacent to each other as viewed along the direction orthogonal to the longitudinal direction of the blade edge.

* * * * *